United States Patent
Lin

(10) Patent No.: US 9,022,617 B2
(45) Date of Patent: May 5, 2015

(54) LENS AND LIGHT EMITTING DIODE BACKLIGHT MODULE HAVING THE SAME

(71) Applicant: Hon Hai Precision Industry Co., Ltd., New Taipei (TW)

(72) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/018,425

(22) Filed: Sep. 5, 2013

(65) Prior Publication Data

US 2014/0169031 A1 Jun. 19, 2014

(30) Foreign Application Priority Data

Dec. 14, 2012 (TW) .............................. 101147397 A

(51) Int. Cl.
| | |
|---|---|
| *F21V 3/00* | (2006.01) |
| *F21V 5/00* | (2006.01) |
| *F21V 5/04* | (2006.01) |
| *G02F 1/1335* | (2006.01) |
| *F21V 8/00* | (2006.01) |
| *G02B 19/00* | (2006.01) |

(52) U.S. Cl.
CPC ............ *F21V 5/04* (2013.01); *G02F 1/133606* (2013.01); *G02B 6/003* (2013.01); *G02B 19/0014* (2013.01)

(58) Field of Classification Search
CPC .......... F21V 5/04; F21V 5/048; G02B 6/0011; G02B 6/003
USPC ................ 362/97.3, 249.02, 311.02, 612, 800
See application file for complete search history.

(56) References Cited

U.S. PATENT DOCUMENTS 7,794,118 B2 * 9/2010 Huang et al. ................... 362/336

* cited by examiner

*Primary Examiner* — Jason Moon Han

(74) *Attorney, Agent, or Firm* — Novak Druce Connolly Bove + Quigg LLP

(57) ABSTRACT

A lens includes a top surface, a bottom surface opposite to the top surface, and a side surface interconnecting outer edges of the top surface and the bottom surface. An aspheric protrusion member protrudes from the top surface. The protrusion member includes coaxial extending portions which are stacked along an optical axis of the lens. A step is formed between each two adjacent extending portions. A receiving chamber is recessed from the bottom surface and oriented toward the top surface. The receiving chamber includes a top surface being roughened to diffuse light and make the diffuse light evenly travel through the lens.

18 Claims, 4 Drawing Sheets

LENS AND LIGHT EMITTING DIODE BACKLIGHT MODULE HAVING THE SAME

BACKGROUND

1. Technical Field

The present disclosure relates to backlight modules, and more particularly to a light emitting diode (LED) backlight module having a lens.

2. Description of Related Art

A conventional LED backlight module includes a backlight plate, a plurality of LEDs mounted on the backlight plate and a lens covering the LEDs and mounted on the backlight plate. The lens is manufactured by injection molding. A mold for the lens is machined by high precision tools and a plurality of concentric recesses is defined in an inner surface of the mold. When the lens is manufactured, a plurality of glue is filled in the mold and solidified by heat. A plurality of concentric protrusions is formed on an outer surface of the lens according with the concentric recesses in the mold. When light emitted from the LED radiates through the concentric protrusions of the lens, a plurality of concentric halos is obtained. Thus, the light of the conventional LED backlight module is unevenly distributed.

What is needed, therefore, is an improved LED backlight module which overcomes the above described shortcomings.

DETAILED DESCRIPTION

An embodiment of an LED backlight module in accordance with the present disclosure will now be described in detail below and with reference to the drawings.

Figure 1:
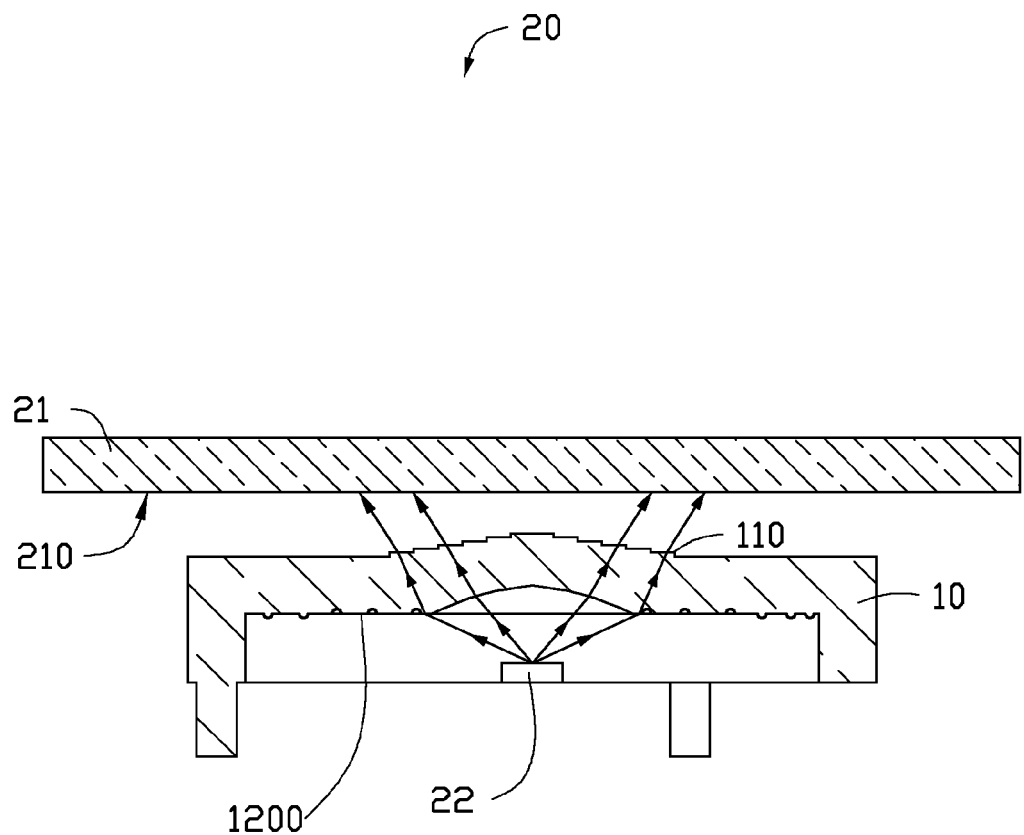
FIG. 1 is a schematic view of an LED backlight module of an exemplary embodiment of the present disclosure.

In the description that follows, the stated orientations of all of the elements of the consumer electronic product assembly are with reference to the orientations of all of the elements as shown in FIG. 1.

Referring to FIG. 1, an LED backlight module 20 in accordance with an exemplary embodiment of the disclosure includes a light guiding plate 21, a lens 10 below the light guiding plate 21, and an LED 22 covering by the lens 10. The lens 10 has an optical axis superposition with an optical axis of the LED 22.

The light guiding plate 21 is an elongated plate and spaced from the lens 10. The light guiding plate 21 has a light guiding surface 210 facing the lens 10. A size of the light guiding plate 21 is larger than that of the lens 10. A central portion of the light guiding plate 21 covers a top end of the lens 10.

Figure 2:
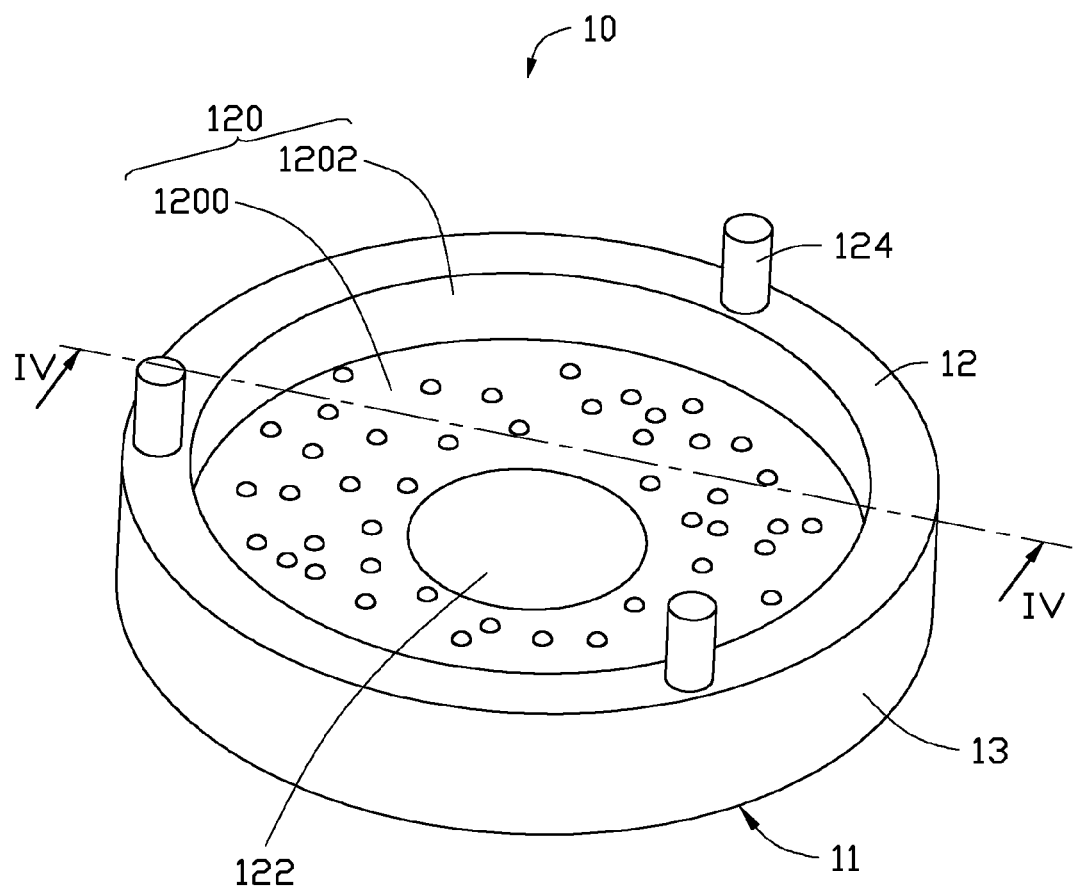
FIG. 2 is an isometric view of a lens of the LED backlight module of FIG. 1.
Figure 3:
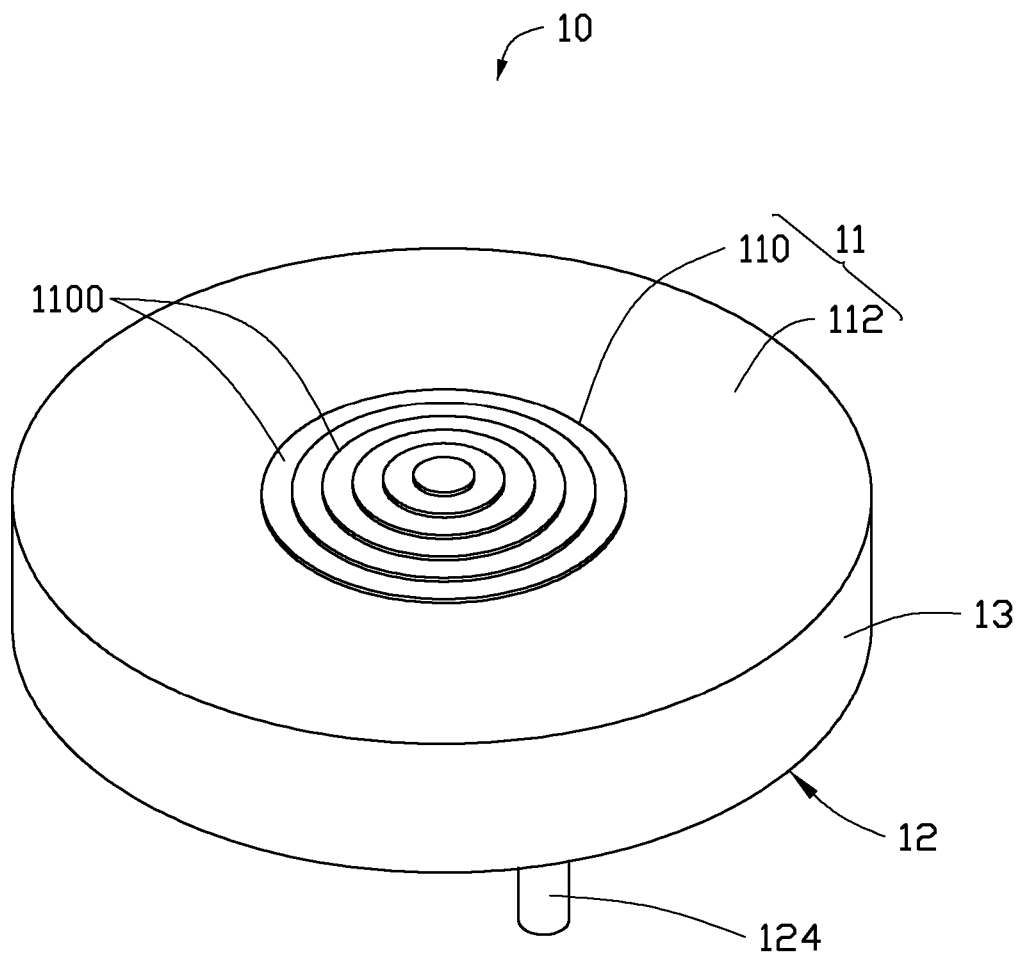
FIG. 3 is an inverted view of the lens of FIG. 2.
Figure 4:
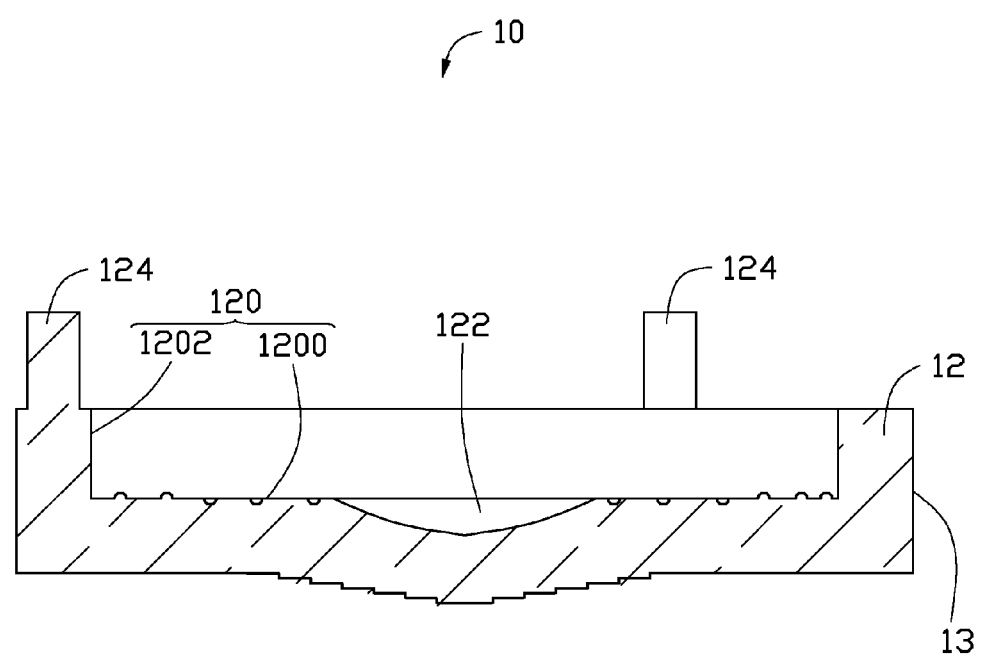
FIG. 4 is a cross-sectional view of the lens of FIG. 2 taken along IV-IV line thereof.

Referring to FIGS. 2 to 4, the lens 10 is made of material with high light transmittance, for example, glass, PMMA (polymethylmethacrylate) or PC (polycarbonate). The lens 10 includes a top surface 11, a bottom surface 12 opposite to the top surface 11, and a side surface 13 interconnecting outer edges of the top surface 11 and the bottom surface 12.

The top surface 11 is circular. A central portion of the top surface 11 is protruded to form an aspheric protrusion member 110 thereon. The protrusion member 110 includes a plurality of annular extending portions 1100. The extending portions 1100 and the top surface 11 are coaxial. The extending portions 1100 are stacked along the optical axis of the lens 10. Diameters of the extending portions 1100 decrease from a central one to a periphery one located at an outside of the central one along a radial direction of the top surface 11. Thus a step is formed between each two adjacent extending portions 1100. In this embodiment, the top surface 11 further includes an annular connecting surface 112 enclosing the protrusion member 110. An inner edge of the connecting surface 112 connects an outer edge of the protrusion member 110. An outer edge of the connecting surface 112 connects a top end of the side surface 13. The connecting surface 112 may be flat, convex, or concave. In this embodiment, the connecting surface 112 is flat. The side surface 13 is cylindrical and opposite ends thereof respectively connect the top surface 11 and the bottom surface 12.

A central portion of the bottom surface 12 is recessed towards the top surface 11 to define a receiving chamber 120 therein. The LED 22 is received in a bottom end of the receiving chamber 120. The receiving chamber 120 is cylindrical and includes a top surface 1200 and a side surface 1202 extending downwardly from an outer periphery of the top surface 1200. The top surface 1200 is roughened to diffuse light emitted from the LED 22 from different directions. A central portion of the top surface 1200 is recessed towards the top surface 11 to define a recess 122 therein. The recess 122 is arc-shaped and convex towards the top surface 11.

A plurality of poles 124 extends downwardly from a periphery of the bottom surface 12 to engage with a printed circuit board (not shown). The bottom surface 12 is flat. The poles 124 are evenly spaced from each other and perpendicular to the bottom surface 12. In this embodiment, each pole 124 is cylindrical and the number of the poles 124 are three.

Referring to FIG. 1 again, when the LED backlight module 20 is operated, light emitted from the LED 22 radiates towards the top surface 1200 of the receiving chamber 120, is diffused by the top surface 1200, and then evenly travels through the lens 10 and radiates to the light guiding surface 210 of the light guiding plate 21.

In this disclosure, the top surface 1200 of the receiving chamber 120 is roughened, so light emitted from the LED 22 can be diffused by the top surface 1200 to different directions to change original radiation directions of the light. The diffused light evenly travels through the lens 10, so no concentric halo can produce.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens for light emitting diode (LED) backlight module comprising:
    a top surface, an aspheric protrusion member protruding from the top surface, the protrusion member comprising a plurality of coaxial extending portions, the extending portions stacked along an optical axis of the lens, a step formed between each two adjacent extending portions;
    a bottom surface opposite to the top surface, a receiving chamber recessed from the bottom surface and oriented toward the top surface, and the receiving chamber comprising a top surface being roughened to diffuse light and make the diffused light evenly travel through the lens; and a side surface interconnecting outer edges of the top surface and the bottom surface.

2. The lens of claim 1, wherein a central portion of the top surface of the receiving chamber is recessed towards the top surface of the lens to define a recess therein.

3. The lens of claim 2, wherein the recess is arc-shaped and convex towards the top surface of the lens.

4. The lens of claim 1, wherein the top surface of the lens further comprises an annular connecting surface enclosing the protrusion member, an inner edge of the connecting surface connects an outer edge of the protrusion member, and an outer edge of the connecting surface connects a top end of the side surface.

5. The lens of claim 4, wherein the connecting surface is flat.

6. The lens of claim 1, wherein the side surface of the lens is cylindrical and opposite ends of the side surface respectively connect the outer edges of the top surface and the bottom surface.

7. The lens of claim 1, wherein the bottom surface is flat, and a plurality of poles extends from the bottom surface and is perpendicular to the bottom surface.

8. The lens of claim 7, wherein the bottom surface is annular and the poles are evenly spaced from each other.

9. The lens of claim 1, wherein the receiving chamber further comprises a side surface extending from the top surface, and the side surface is cylindrical.

10. A light emitting diode (LED) backlight module comprising:
a light guiding plate;
an LED; and
a lens below the light guiding plate and covering the LED, the lens comprising:
a top surface, an aspheric protrusion member protruding from the top surface, the protrusion member comprising a plurality of coaxial extending portions, the extending portions stacked along an optical axis of the lens, a step formed between each two adjacent extending portions;
a bottom surface opposite to the top surface, a receiving chamber recessed from the bottom surface and oriented toward the top surface, and the receiving chamber comprising a top surface being roughened to diffuse light emitted from the LED and make the diffuse light evenly travel through the lens and radiate towards the light guiding plate; and
a side surface interconnecting outer edges of the top surface and the bottom surface.

11. The LED backlight module of claim 10, wherein the light guiding plate has a light guiding surface facing the lens and spaced from the lens.

12. The LED backlight module of claim 11, wherein a size of the light guiding plate is larger then that of the lens, and a central portion of the light guiding plate covers a top end of the lens.

13. The LED backlight module of claim 10, wherein diameters of the extending portions decrease from a central one to a periphery one located at an outside of the central one along a radial direction of the top surface.

14. The LED backlight module of claim 10, wherein a central portion of the top surface of the receiving chamber is recessed towards the top surface of the lens to define a recess therein.

15. The LED backlight module of claim 14, wherein the recess is arc-shaped and convex towards the top surface.

16. The LED backlight module of claim 10, wherein a plurality of poles extends from the bottom surface and is perpendicular to the bottom surface.

17. The LED backlight module of claim 16, wherein the bottom surface is annular and the poles are evenly spaced from each other.

18. The LED backlight module of claim 10, wherein the lens has an optical axis superposition with an optical axis of the LED.

* * * * *